United States Patent
Lee et al.

(10) Patent No.: US 9,699,822 B2
(45) Date of Patent: Jul. 4, 2017

(54) METHOD AND APPARATUS FOR TRANSMITTING MESSAGE IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/439,684

(22) PCT Filed: Nov. 1, 2013

(86) PCT No.: PCT/KR2013/009838
§ 371 (c)(1),
(2) Date: Apr. 30, 2015

(87) PCT Pub. No.: WO2014/069931
PCT Pub. Date: May 8, 2014

(65) Prior Publication Data
US 2015/0271867 A1 Sep. 24, 2015

Related U.S. Application Data

(60) Provisional application No. 61/721,453, filed on Nov. 1, 2012.

(51) Int. Cl.
*H04W 76/02* (2009.01)
*H04L 1/18* (2006.01)

(52) U.S. Cl.
CPC ......... *H04W 76/028* (2013.01); *H04L 1/1858* (2013.01); *H04W 76/02* (2013.01)

(58) Field of Classification Search
CPC .... H04W 76/028; H04W 76/02; H04L 1/1858
See application file for complete search history.

(56) References Cited

U.S. PATENT DOCUMENTS

2008/0130619 A1* 6/2008 Cha .................. H04L 1/1685
370/346
2009/0161571 A1* 6/2009 Terry .................... H04L 1/188
370/252
(Continued)

FOREIGN PATENT DOCUMENTS

| WO | 2010/151089 A2 | 12/2010 |
| WO | 2011099745 A2 | 8/2011 |
| WO | 2012060565 A2 | 5/2012 |

*Primary Examiner* — Chi H Pham
*Assistant Examiner* — Weibin Huang
(74) *Attorney, Agent, or Firm* — Dentons US LLP (57) ABSTRACT

A method and apparatus for transmitting a message in a wireless communication system is provided. A user equipment (UE) submits a message to a packet data convergence protocol (PDCP) layer and a radio link control (RLC) layer, detects a radio link failure or a handover failure, checks whether the RLC layer receives acknowledgement (ACK) to the message from the network, reestablishes the connection with the network, and retransmits the message upon the reestablishment if the RLC layer does not receive the ACK to the message.

12 Claims, 8 Drawing Sheets

(56) References Cited

U.S. PATENT DOCUMENTS

| | | | |
|---|---|---|---|
| 2009/0175163 A1* | 7/2009 | Sammour | H04L 1/1685 370/216 |
| 2009/0190554 A1 | 7/2009 | Cho | |
| 2009/0264127 A1* | 10/2009 | Chun | H04L 1/1607 455/435.2 |
| 2010/0097987 A1 | 4/2010 | Chun et al. | |
| 2011/0242970 A1 | 10/2011 | Prakash et al. | |
| 2012/0063298 A1 | 3/2012 | Yi et al. | |
| 2014/0036798 A1* | 2/2014 | Kanamarlapudi | H04W 72/0406 370/329 |
| 2015/0223166 A1* | 8/2015 | Keskitalo | H04W 52/0212 370/311 |

* cited by examiner

METHOD AND APPARATUS FOR TRANSMITTING MESSAGE IN WIRELESS COMMUNICATION SYSTEM

This application is a 35 U.S.C. §371 National Stage Entry of International Application No. PCT/KR2013/009838 filed Nov. 1, 2013, which claims benefit of and priority to U.S. Provisional Application No. 61/721,453 filed Nov. 1, 2012, both of which are incorporated by reference for all purposes as if fully set forth herein.

BACKGROUND OF THE INVENTION

Field of the Invention

The present invention relates to wireless communications, and more particularly, to a method and apparatus for transmitting a message in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

For informing a network of a user equipment (UE)'s power saving preference, a power preference indication may be transmitted. Above this, various types of UE-originated indications, such as an in-device coexistence (IDC) indication, a proximity indication, and a multimedia broadcast multicast services (MBMS) interest indication, may be transmitted from the UE to the network. Such indications may be called UE-initiated messages.

When a radio resource control (RRC) layer of the UE transmits any UE-initiated message, L2 of the UE performs transmission and retransmissions of automatic repeat request (ARQ) and hybrid ARQ (HARQ) to reliably carry the UE-initiated message. At this time, the RRC layer of the UE may declare a radio link failure (RLF) or handover failure (HOF), and accordingly, perform reestablishment procedure. Therefore, upon the reestablishment, the L2 of the UE may not retransmit the message any more.

A method for transmitting a UE-initiated message upon reestablishment reliably may be required.

SUMMARY OF THE INVENTION

The present invention provides a method for transmitting a message in a wireless communication system. The present invention provides a method for retransmitting a user equipment (UE)-initiated message upon reestablishment.

In an aspect, a method for transmitting, by a user equipment (UE), a message in a wireless communication system is provided. The method includes submitting a message to a packet data convergence protocol (PDCP) layer and a radio link control (RLC) layer, detecting a radio link failure or a handover failure, checking whether the RLC layer receives acknowledgement (ACK) to the message from the network, reestablishing the connection with the network, and retransmitting the message upon the reestablishment if the RLC layer does not receive the ACK to the message.

The message may be one of a multimedia broadcast multicast services (MBMS) interest indication, an in-device coexistence (IDC) indication, or a power preference indication.

The method may further include suspending all radio bearers except signaling radio bearer (SRB) 0.

The reestablishing the connection may comprise transmitting a radio resource control (RRC) connection reestablishment request message to the network, and receiving an RRC connection reestablishment message from the network. The method may further include discarding all protocol data units (PDUs) and service data units (SDUs) in the RLC layer and the PDCP layer, upon receiving the RRC connection reestablishment message. The method may further include transmitting an RRC connection reestablishment complete message to the network.

In another aspect, a user equipment (UE) in a wireless communication system is provided. The UE includes a radio frequency (RF) unit for transmitting or receiving a radio signal, and a processor coupled to the RF unit, and configured to submit a message to a packet data convergence protocol (PDCP) layer and a radio link control (RLC) layer, detect a radio link failure or a handover failure, check whether the RLC layer receives acknowledgement (ACK) to the message from the network, reestablish the connection with the network, and retransmit the message upon the reestablishment if the RLC layer does not receive the ACK to the message.

UE-initiated messages can be retransmitted to a network upon reestablishment.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
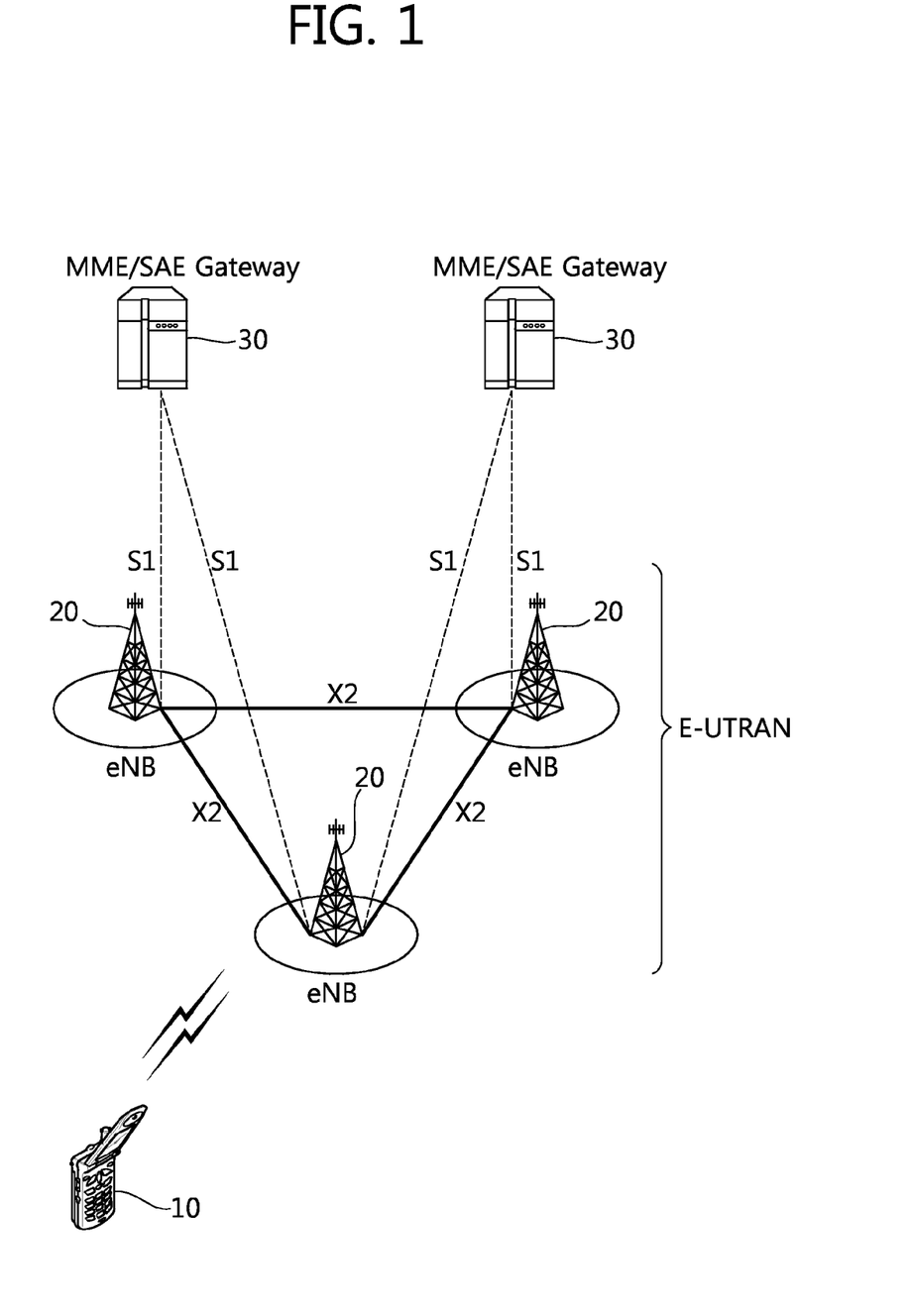
FIG. 1 shows LTE system architecture.

FIG. 1 shows LTE system architecture.

The LTE system architecture includes a user equipment (10), an evolved-UMTS terrestrial radio access network (E-UTRAN) and an evolved packet core (EPC). The UE 10 may be fixed or mobile, and may be referred to as another terminology, such as a mobile station (MS), a user terminal (UT), a subscriber station (SS), a wireless device, etc. The E-UTRAN includes a plurality of evolved node-Bs (eNBs) 20. The eNB 20 provides a control plane and a user plane to the UE 10. The eNB 20 is generally a fixed station that communicates with the UE 10 and may be referred to as another terminology, such as a base station (BS), a base transceiver system (BTS), an access point, etc. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

The EPC includes a mobility management entity (MME) which is in charge of control plane functions, and a serving gateway (S-GW) which is in charge of user plane functions. The EPC may further include a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN.

Interfaces for transmitting user traffic or control traffic may be used. The UE 10 and the eNB 20 are connected by means of a Uu interface. The eNBs 20 are interconnected by means of an X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

Figure 2:
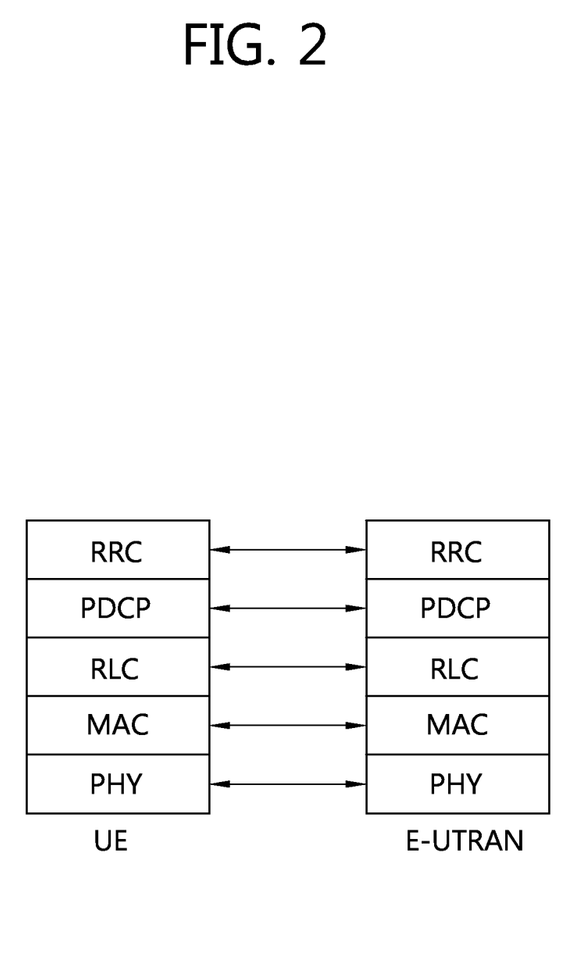
FIG. 2 shows a control plane of a radio interface protocol of an LTE system.
Figure 3:
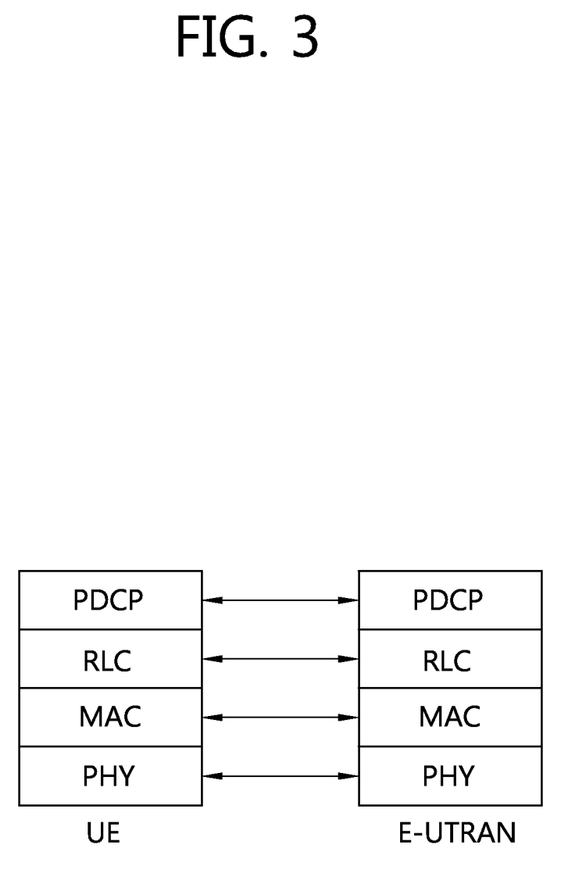
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides an upper layer with an information transfer service through a physical channel. The PHY layer is connected to a medium access control (MAC) layer, which is an upper layer of the PHY layer, through a transport channel. Data is transferred between the MAC layer and the PHY layer through the transport channel. The transport channel is classified into a common transport channel and a dedicated transport channel according to whether the channel is shared or not. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
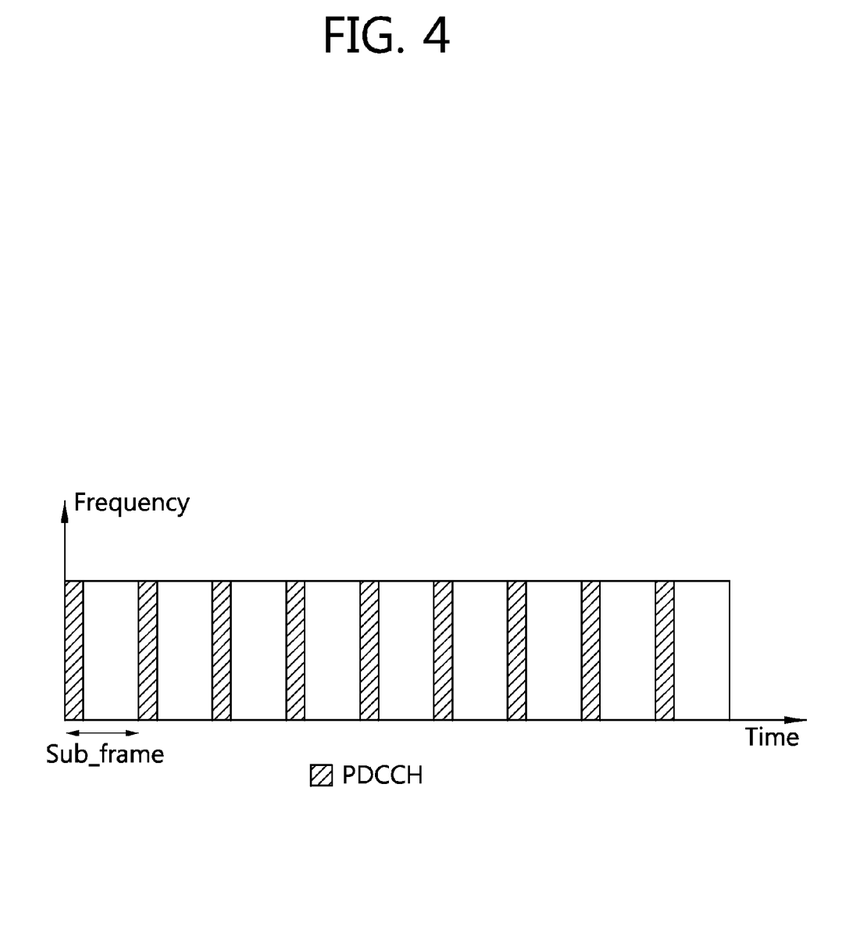
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks may be transmitted with the same periodicity. Traffic or control signals of a multimedia broadcast/multicast service (MBMS) may be transmitted through the DL-SCH or a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belongs to the L2. The MAC layer provides a function of mapping multiple logical channels to multiple transport channels. The MAC layer also provides a function of logical channel multiplexing by mapping multiple logical channels to a single transport channel. The MAC layer is connected to a radio link control (RLC) layer, which is an upper layer of the MAC layer, through the logical channel.

The logical channel is classified into a control channel for transmitting control plane information and a traffic channel for transmitting user plane information, according to a type of transmitted information.

The logical channel is located above the transport channel, and is mapped to the transport channel. The logical includes a broadcast control channel (BCCH), a paging control channel (PCCH), a common control channel (CCCH), a multicast control channel (MCCH), a multicast traffic channel (MTCH), etc.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression, which decreases a size of an Internet protocol (IP) packet header which contains relatively large-sized and unnecessary control information, to support effective transmission in a radio section having a narrow bandwidth, when IP packets, i.e., IPv4 or IPv6, transmitted. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L1 and L2 for data delivery between the UE and the network. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC layer of the UE is logically connected to an RRC layer of the E-UTRAN. When an RRC connection is established between the RRC layer of the UE and the RRC layer of the E-UTRAN, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Power preference indication procedure is described.

During handover, if the RRCConnectionReconfiguration message includes the mobilityControlInfo and the UE is able to comply with the configuration included in this message, the UE shall:
1> if the RRCConnectionReconfiguration message includes the powerPrefIndicationConfig:
2> perform the power preference indication procedure;
During reconfiguration, if the UE is able to comply with the configuration included in the RRCConnectionReconfiguration message, the UE shall:
1> if the RRCConnectionReconfiguration message includes the powerPrefIndicationConfig:
2> perform the power preference indication procedure;

The power preference indication procedure may be performed by a UE assistance information procedure. The purpose of the UE assistance information procedure is to inform the E-UTRAN of the UE's power saving preference. The E-UTRAN may assume that the UE prefers a default configuration for power saving initially when it configures and enables the UE for power preference indication.

Figure 5:
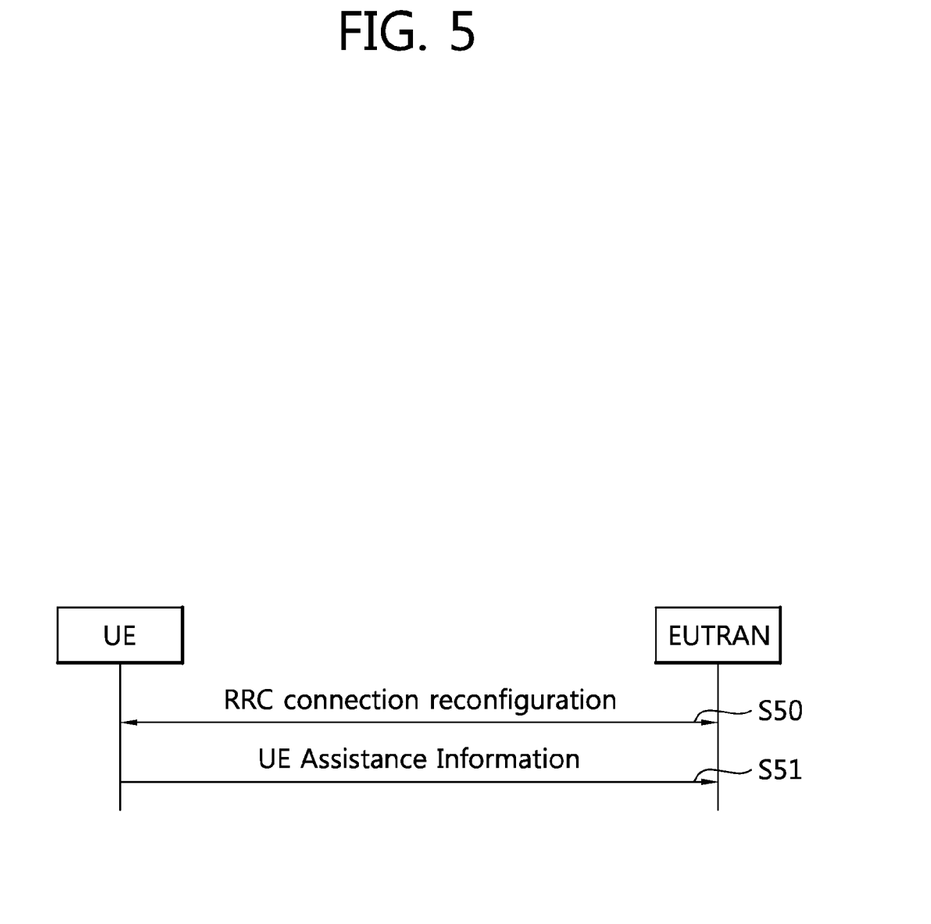
FIG. 5 shows a UE assistance information procedure.

FIG. 5 shows a UE assistance information procedure. At step S50, the UE and the E-UTRAN performs an RRC connection reconfiguration procedure. At step S51, the UE transmits a UEAssistanceInformation message to the E-UTRAN on a dedicated control channel (DCCH).

A UE capable of providing power preference indications in RRC_CONNECTED may initiate the procedure only if:
1> the received powerPrefIndicationConfig includes the powerPrefIndication-Enabled; and
1> the UE did not indicate any power saving preference since last entering RRC_CONNECTED on the current primary cell (PCell), or the current UE preference is different from the one indicated in the last transmission of the UEAssistanceInformation message to the current Pcell; and
1> timer T340 is not running.

Upon initiating the procedure, the UE shall:
1> if the UE prefers a default configuration for power saving:
2> start timer T340 with the timer value set to the powerPrefIndication-Timer;
1> initiate transmission of the UEAssistanceInformation message;

The UE shall set the contents of the UEAssistanceInformation message as follows:
1> if the UE prefers a default configuration for power saving:
2> set powerPrefIndication to default;
1> else if the UE prefers a configuration primarily optimised for power saving:
2> set powerPrefIndication to lowpowerconsumption;
The UE shall submit the UEAssistanceInformation message to lower layers for transmission.

Table 1 shows an example of the UEAssistanceInformation message. The UEAssistanceInformation message is used for the indication of UE assistance information to the eNB.

TABLE 1

```
-- ASN1START
UEAssistanceInformation ::= SEQUENCE {
    criticalExtensions CHOICE {
        c1 CHOICE{
            ueAssistanceInformation-r11
            UEAssistanceInformation-r11-IEs,
            spare7 NULL,    spare6 NULL, spare5 NULL,
            spare4 NULL, spare3 NULL, spare2
NULL, spare1 NULL
        },
        CriticalExtensionsFuture SEQUENCE { }
    }
}
UEAssistanceInformation-r11-IEs ::= SEQUENCE {
    powerPrefIndication-r11 PowerPrefIndication-r11 OPTIONAL,
    nonCriticalExtension SEQUENCE { } OPTIONAL
}
-- ASN1STOP
```

Referring to Table 1, the UEAssistanceInformation message includes a PowerPrefIndication information element (IE). Table 2 shows an example of the PowerPrefIndication IE. The PowerPrefIndication IE is used to provide information related to the UE power saving preference.

TABLE 2

```
-- ASN1START
PowerPrefIndication-r11 ::= ENUMERATED {default,
lowpowerconsumption}
-- ASN1STOP
```

Referring to Table 2, 'default' indicates the UE preference for a default configuration for power saving, and 'lowpowerconsumption' indicates the UE preference for a configuration that is primarily optimized for power saving.

A configuration for the power preference indication procedure, i.e., powerPrefIndicationConfig, is included in an OtherConfig IE in the RRC connection reconfiguration message. Table 3 shows an example of the OtherConfig IE. The OtherConfig IE contains configuration related to other configuration.

TABLE 3

```
-- ASN1START
OtherConfig-r9 ::= SEQUENCE {
    reportProximityConfig-r9 ReportProximityConfig-r9 OPTIONAL,
    -- Need ON
    ...,
    [[ powerPrefIndicationConfig-r11
        PowerPrefIndicationConfig-r11 OPTIONAL, -- Need
ON
    ]]
}
ReportProximityConfig-r9 ::= SEQUENCE {
    proximityIndicationEUTRA-r9 ENUMERATED {enabled}
    OPTIONAL, -- Need OR
    proximityIndicationUTRA-r9 ENUMERATED {enabled}
    OPTIONAL -- Need OR
}
PowerPrefIndicationConfig-r11 ::= SEQUENCE {
    powerPrefIndication-Enabled-r11 ENUMERATED {enabled}
    OPTIONAL, -- Need OR
```

TABLE 3-continued

```
    powerPrefIndication-Timer-r11 ENUMERATED {
        s0, s0dot5, s1, s2, s5, s10, s20, s30, s60, s90, s120, s300, s600,
        spare3, spare2, spare1}
} OPTIONAL,    -- Cond ppiENABLED
-- ASN1STOP
```

Referring to Table 3, the powerPrefIndication-Enabled field is used to indicate whether the power preference indication reporting from the UE is allowed or not. The powerPrefIndication-Timer indicates a prohibit timer, value in seconds, for the power preference indication reporting. Value s0 means prohibit timer is set to 0 second or not set, value s0dot5 means prohibit timer is set to 0.5 second, value s1 means prohibit timer is set to 1 second and so on. The ppiENABLED field is mandatory present in case powerPrefIndication-Enabled is present; otherwise the field is not present.

In-device coexistence (IDC) indication procedure is described.

During handover, if the RRCConnectionReconfiguration message includes the mobilityControlInfo and the UE is able to comply with the configuration included in this message, the UE shall:
1> if the RRCConnectionReconfiguration message includes the idc-Config:
2> perform the In-device coexistence indication procedure;
During reconfiguration, if the UE is able to comply with the configuration included in the RRCConnectionReconfiguration message, the UE shall:
1> if the RRCConnectionReconfiguration message includes the idc-Config:
2> perform the In-device coexistence indication procedure;
The purpose of the IDC indication procedure is to inform the E-UTRAN about (a change of) the ID problems experienced by the UE in RRC_CONNECTED and to provide the E-UTRAN with information in order to resolve them.

Figure 6:
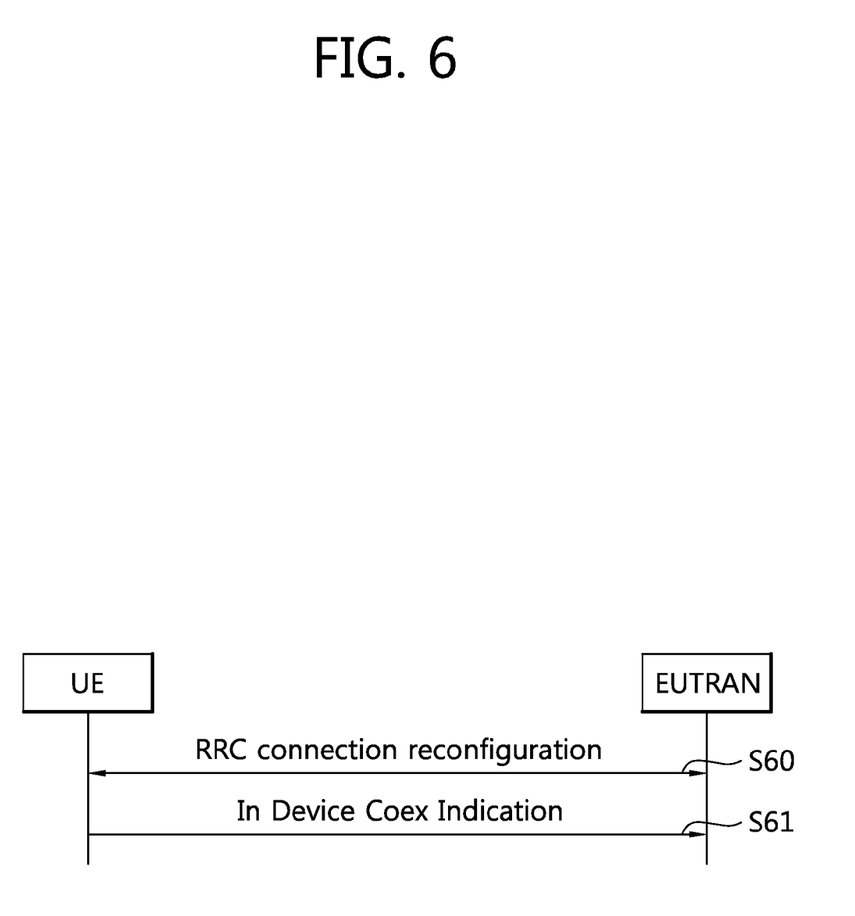
FIG. 6 shows an IDC indication procedure.

FIG. 6 shows an IDC indication procedure. At step S60, the UE and the E-UTRAN performs an RRC connection reconfiguration procedure. At step S51, the UE transmits an InDeviceCoexIndication message to the E-UTRAN on a DCCH.

A UE in RRC_CONNECTED shall:
1> if the received otherConfig includes the idc-Config set to setup:
2> if on one or more frequencies for which a measObject-EUTRA is configured, the UE is experiencing IDC problems that it cannot solve by itself:
3> initiate the transmission of the InDeviceCoexIndication message;
2> if since the last transmission of the InDeviceCoexIndication message:
3> if no frequency is any longer experiencing IDC problems as reported in the last InDeviceCoexIndication message; or
3> if the set of frequencies for which a measObjectEUTRA is configured and on which the UE is experiencing IDC problems that it cannot solve by itself, has changed; or
3> if for one or more of the frequencies in this set of frequencies, the interferenceDirection has changed; or
3> if the TDM assistance information has changed:
4> initiate the transmission of the InDeviceCoexIndication message.

The UE shall set the contents of the InDeviceCoexIndication message as follows:
1> if there is at least one E-UTRA carrier frequency affected by the IDC problems:

2> include the IE affectedCarrierFreqList with an entry for each affected E-UTRA carrier frequency for which a measurement object is configured;

2> for each E-UTRA carrier frequency included in the IE affectedCarrierFreqList, include interferenceDirection and set it accordingly;

2> include time domain multiplexing (TDM) based assistance information:

3> if the UE has discontinuous reception (DRX) related assistance information that could be used to resolve the IDC problems:

4> include drx-CycleLength, drx-Offset and drx-ActiveTime;

3> else if the UE has desired subframe reservation patterns related assistance information that could be used to resolve the IDC problems:

4> include idc-SubframePatternList.

The UE shall submit the InDeviceCoexIndication message to lower layers for transmission.

Table 4 shows an example of the InDeviceCoexIndication message. The InDeviceCoexIndication message is used to inform the E-UTRAN about the IDC problems experienced by the UE, any changes in the IDC problems previously informed, and to provide the E-UTRAN with information in order to resolve them.

TABLE 4

```
-- ASN1START
InDeviceCoexIndication-r11 ::= SEQUENCE {
    criticalExtensions CHOICE {
        c1 CHOICE {
            inDeviceCoexIndication-r11
            InDeviceCoexIndication-r11-IEs,
            spare3 NULL, spare2 NULL, spare1 NULL
        },
        criticalExtensionsFuture SEQUENCE { }
    }
}
InDeviceCoexIndication-r11-IEs ::= SEQUENCE {
    affectedCarrierFreqList-r11 AffectedCarrierFreqList-r11 OPTIONAL,
    tdm-AssistanceInfo-r11 TDM-AssistanceInfo-r11 OPTIONAL,
    lateNonCriticalExtension OCTET STRING OPTIONAL,
    nonCriticalExtension SEQUENCE { } OPTIONAL
}
AffectedCarrierFreqList-r11 ::= SEQUENCE    (SIZE
(1..maxFreqIDC-r11))        OF
AffectedCarrierFreq-r11
AffectedCarrierFreq-r11 ::= SEQUENCE {
    carrierFreq-r11 MeasObjectId,
    interferenceDirection-r11 ENUMERATED {eutra, other, both, spare}
}
TDM-AssistanceInfo-r11 ::= CHOICE {
    drx-AssistanceInfo-r11 SEQUENCE {
    drx-CycleLength-r11 ENUMERATED {n1} OPTIONAL,
    drx-Offset-r11 ENUMERATED {n1} OPTIONAL,
    drx-ActiveTime-r11 ENUMERATED {n1} OPTIONAL
    },
    idc-SubframePattern-r11 SEQUENCE {
        idc-SubframePatternList-r11 IDC-SubframePatternList-r11
    },
    ...
}
IDC-SubframePatternList-r11 ::=SEQUENCE (SIZE
(1..maxSubframePatternIDC-r11)) OF
IDC-SubframePattern-r11
IDC-SubframePattern-r11 ::= CHOICE {
    subframePatternFDD-r11 BIT STRING (SIZE (40)),
    subframePatternTDD-r11 CHOICE {
```

TABLE 4-continued

```
        subframeConfig0-r11 BIT STRING (SIZE (70)),
        subframeConfig1-5-r11 BIT STRING (SIZE (10)),
        subframeConfig6-r11 BIT STRING (SIZE (60))
    },
    ...
}
-- ASN1STOP
```

When the RRC layer of the UE submits any UE initiated message, such as MBMS interest indication, IDC indication or power preference indication, L2 of the UE performs transmission and retransmissions of ARQ and HARQ to reliably carry the message. One problem is that while L2 of the UE is transmitting the message with ARQ or HARQ, the RRC layer of the UE may declare a radio link failure (RLF) or handover failure (HOF), and accordingly, perform reestablishment procedure. Then, upon reestablishment, UE may reestablish the RLC and PDCP, and so, discard all stored protocol data units (PDUs) and service data units (SDUs). As a result, upon the reestablishment, the L2 of the UE may not retransmit the message any more. Hence, UE may provide bad experience to a user because the message is not transmitted to the network due to reestablishment.

To solve the problem described above, a method for retransmitting a message may be provided according to an embodiment of the present invention. The method for retransmitting a message may include submitting a message to the PDCP layer and the RLC layer, detecting radio link failure or handover failure, checking whether or not to receive positive RLC acknowledgement from the network, reestablishing the connection with the network, and retransmitting the message upon reestablishment in the RRC layer of the UE. That is, if the UE recognizes that no RLC ACK to the message has been received from the source eNB, the UE may transmit the message after reestablishment. It is assumed that the source eNB transmits the RLC ACKed message to the target eNB anyhow.

Figure 7:
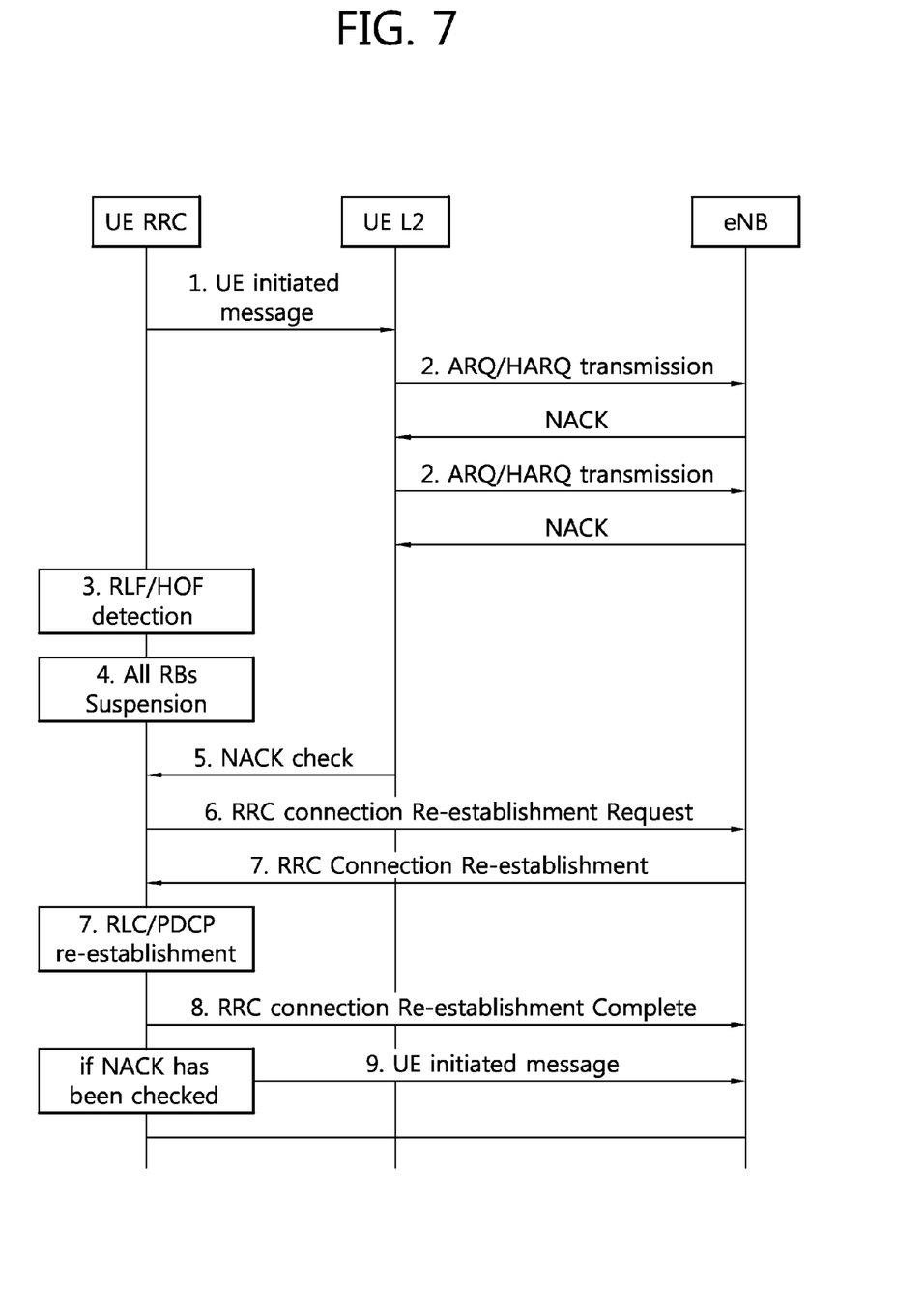
FIG. 7 shows an example of a method for retransmitting a message according to an embodiment of the present invention.

FIG. 7 shows an example of a method for retransmitting a message according to an embodiment of the present invention.

1. The RRC layer of the UE initiates the UE-initiated message such as MBMS interest indication, IDC indication, or power preference indication. The RRC layer of the UE transmits the UE-initiated message to L2, i.e., PDCP/RLC/MAC, of the UE to transmit the UE-initiated message to the eNB.

2. The L2 of the UE performs (re-)transmission of the UE-initiated message based on an ARQ and HARQ operation. If the L2 of the UE receives NACK from the eNB, the L2 of the UE re-transmit a PDU containing the UE-initiated message.

3. The RRC layer of the UE may detect radio link failure or handover failure. Upon detection of the RLF/HOF, The RRC layer of the UE initiates the RRC connection reestablishment procedure.

4. For reestablishment, the RRC layer of the UE suspends all radio bearers expect SRB0.

5. The RRC layer of the UE checks whether or not the RLC layer of the UE receives ARQ ACK to the (re-)transmission of the UE-initiated message, before initiating reestablishment (before RB suspension).

6. The UE performs cell selection and then the RRC layer of the UE transmits the RRC connection reestablishment request to the selected cell.

7. In response to the RRC connection reestablishment request, the RRC layer of the UE receives the RRC connection reestablishment message. Upon receiving the RRC connection reestablishment message, the UE reestablishes RLC/PDCP and so discard all stored PDU/SDUs in RLC/PDCP.

8. The RRC layer of the UE transmits the RRC connection reestablishment complete message to the eNB.

9. If the RRC layer of the UE has checked that RLC ACK to (re-)transmission of the UE-initiated message was not received from the previous cell, the RRC layer of the UE retransmits the UE-initiated message to the L2 of the UE after re-establishment. Then, the L2 of the UE transmits the UE-initiated message to the selected cell with ARQ/HARQ operation.

In addition, the UE may transmit the UE-initiated message to one eNB and then perform handover to another eNB. In this case, if RLC ACK to the UE-initiated message has been not received from the source eNB before handover, the UE retransmits the UE-initiated message to the target eNB after handover.

Alternatively, the UE may avoid transmitting the UE-initiated message right after transmitting a measurement report. Hence, if the UE-initiated message is triggered, the UE transmits the UE-initiated message a certain time interval later after transmitting the measurement report. The certain time interval may be fixed to a certain value or configured by the network.

Figure 8:
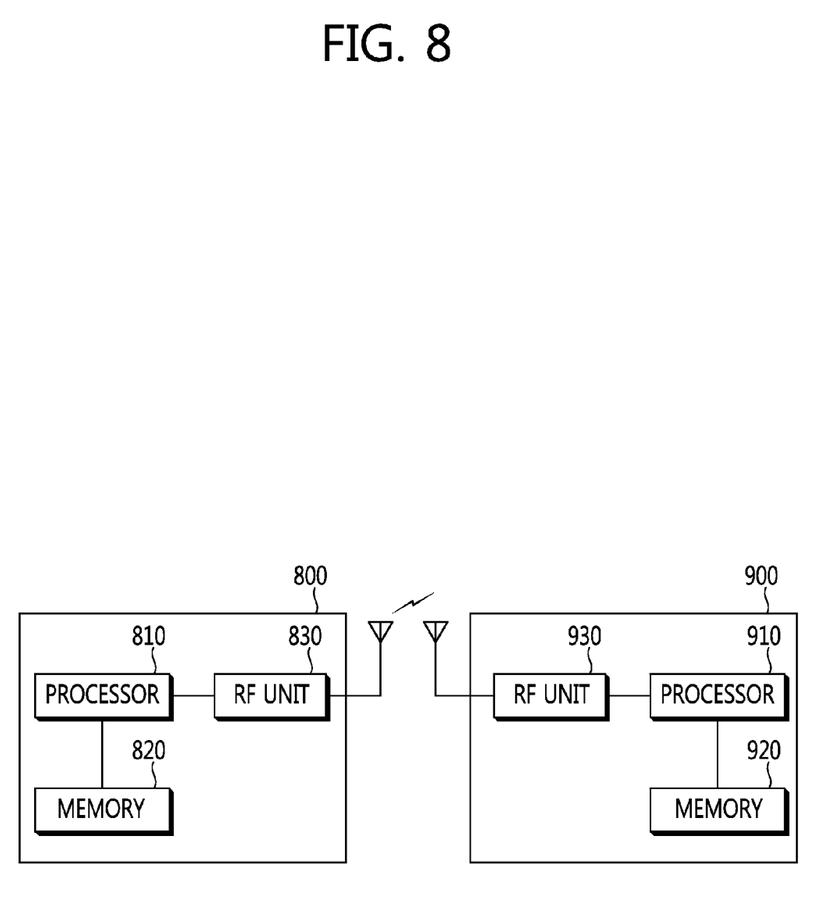
FIG. 8 is a block diagram showing wireless communication system to implement an embodiment of the present invention.

FIG. 8 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the embodiments of the present invention, the UE may perform per cell (frequency) based or per UE based LTE autonomous denial in multiple cells (frequencies) which can be all the serving cells including PCell and Scells or cells indicated by the network.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting a message in a wireless communication system, the method performed by a user equipment (UE) and comprising:
    submitting a message to a packet data convergence protocol (PDCP) layer and a radio link control (RLC) layer;
    detecting a radio link failure (RLF) or a handover failure;
    determining whether or not the RLC layer receives acknowledgement (ACK) or negative acknowledgement (NACK) for the message from the network; and
    performing reestablishment of the connection with the network,
    wherein when the RLC layer does not receive the ACK for the message and the UE detects the RLF or the handover failure, the UE retransmits the message upon completing the reestablishment although the RLC layer does not receive the NACK for the message.

2. The method of claim 1, wherein the message includes at least one of a multimedia broadcast multicast services (MBMS) interest indication, an in device coexistence (IDC) indication, or a power preference indication (PPI).

3. The method of claim 1, further comprising:
    suspending all radio bearers except signaling radio bearer (SRB) 0.

4. The method of claim 1, wherein performing reestablishment of the connection comprises:
    transmitting a radio resource control (RRC) connection reestablishment request message to the network; and
    receiving an RRC connection reestablishment message from the network.

5. The method of claim 4, further comprising:
    discarding all protocol data units (PDUs) and service data units (SDUs) in the RLC layer and the PDCP layer, upon receiving the RRC connection reestablishment message.

6. The method of claim 4, further comprising:
    transmitting an RRC connection reestablishment complete message to the network.

7. A user equipment (UE) in a wireless communication system, the UE comprising:
    a radio frequency (RF) unit that transmits or receives a radio signal; and
    a processor, coupled to the RF unit that:
    submits a message to a packet data convergence protocol (PDCP) layer and a radio link control (RLC) layer;
    detects a radio link failure (RLF) or a handover failure;
    determines whether or not the RLC layer receives acknowledgement (ACK) or negative acknowledgement (NACK) for the message from the network; and preforms reestablishment of the connection with the network, wherein when the RLC layer does not receive the ACK for the message and the processor detects the RLF or the handover failure, the processor controls the RF unit to retransmit the message upon completing the reestablishment although the RLC layer does not receive the NACK for the message.

8. The UE of claim 7, wherein the message includes at least one of a multimedia broadcast multicast services (MBMS) interest indication, an in-device coexistence (IDC) indication, or a power preference indication (PPI).

9. The UE of claim 7, wherein the processor suspends all radio bearers except signaling radio bearer (SRB) 0.

10. The UE of claim 7, wherein the processor, in performing reestablishment of the connection, controls the RF unit to:
  transmit a radio resource control (RRC) connection reestablishment request message to the network; and
  receive an RRC connection reestablishment message from the network.

11. The UE of claim 10, wherein the processor discards all protocol data units (PDUs) and service data units (SDUs) in the RLC layer and the PDCP layer, upon receiving the RRC connection reestablishment message.

12. The UE of claim 10, wherein the processor controls the RF unit to transmit an RRC connection reestablishment complete message to the network.

* * * * *